United States Patent
Buchanan

(10) Patent No.: US 8,326,726 B2
(45) Date of Patent: Dec. 4, 2012

(54) SYSTEMS AND METHODS TO ALLOCATE RELEVANCY OF GLOBAL ASSET PEERS

(76) Inventor: Timothy Buchanan, Jacksonville, FL (US)

(*) Notice: Subject to any disclaimer, the term of this patent is extended or adjusted under 35 U.S.C. 154(b) by 0 days.

(21) Appl. No.: 13/136,518

(22) Filed: Aug. 3, 2011

(65) Prior Publication Data

US 2012/0089536 A1 Apr. 12, 2012

Related U.S. Application Data

(63) Continuation-in-part of application No. 11/591,212, filed on Nov. 1, 2006, now abandoned.

(60) Provisional application No. 60/801,630, filed on May 18, 2006.

(51) Int. Cl.
*G06Q 40/00* (2006.01)

(52) U.S. Cl. .................................. 705/36 R; 705/37

(58) Field of Classification Search ............... 705/36 R, 705/37

See application file for complete search history.

(56) References Cited

U.S. PATENT DOCUMENTS

| | | | |
|---|---|---|---|
| 6,856,973 B1 * | 2/2005 | Bott | 705/36 R |
| 7,725,374 B2 * | 5/2010 | Van Erlach et al. | 705/35 |
| 7,949,590 B2 * | 5/2011 | Strongin, II | 705/36 R |
| 2003/0088492 A1 * | 5/2003 | Damschroder | 705/36 |
| 2003/0120574 A1 * | 6/2003 | Wallman | 705/36 |
| 2003/0120575 A1 * | 6/2003 | Wallman | 705/36 |
| 2005/0080704 A1 * | 4/2005 | Erlach et al. | 705/36 |
| 2005/0131796 A1 * | 6/2005 | Bridges et al. | 705/36 |
| 2006/0004653 A1 * | 1/2006 | Strongin | 705/39 |

* cited by examiner

*Primary Examiner* — Jagdish Patel
*Assistant Examiner* — Sara C Hamilton
(74) *Attorney, Agent, or Firm* — Thomas C. Saitta

(57) ABSTRACT

The present invention provides apparatus and methods to facilitate allocation of find assets amongst asset classes including: equity inverse assets, precious metal assets, commodities and hard assets, international equity, international fixed income, domestic fixed income and domestic equity.

19 Claims, 7 Drawing Sheets

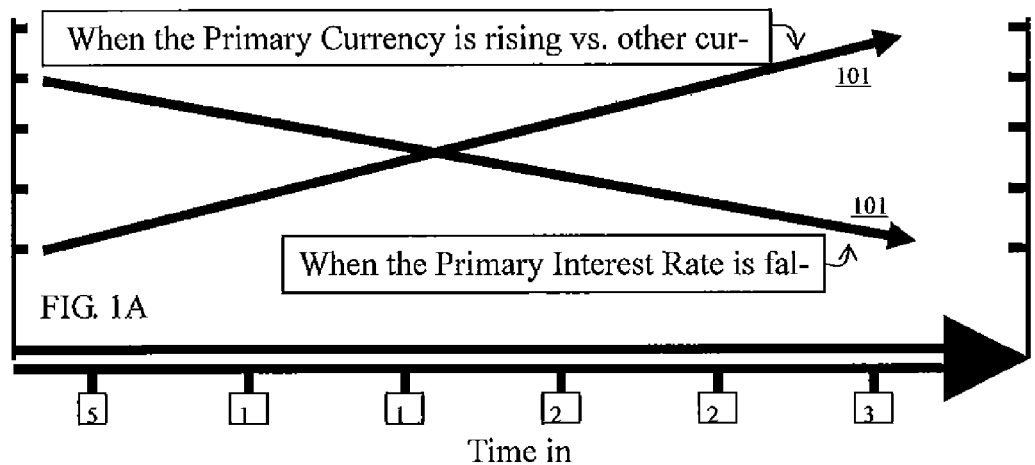
FIG. 1A
FIG. 1B
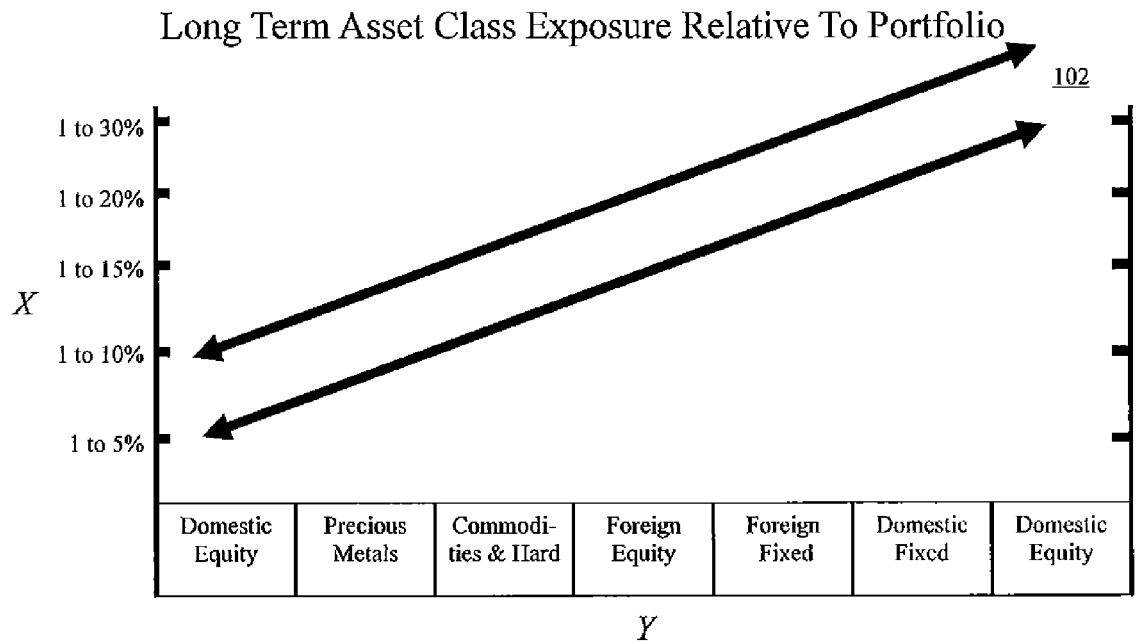

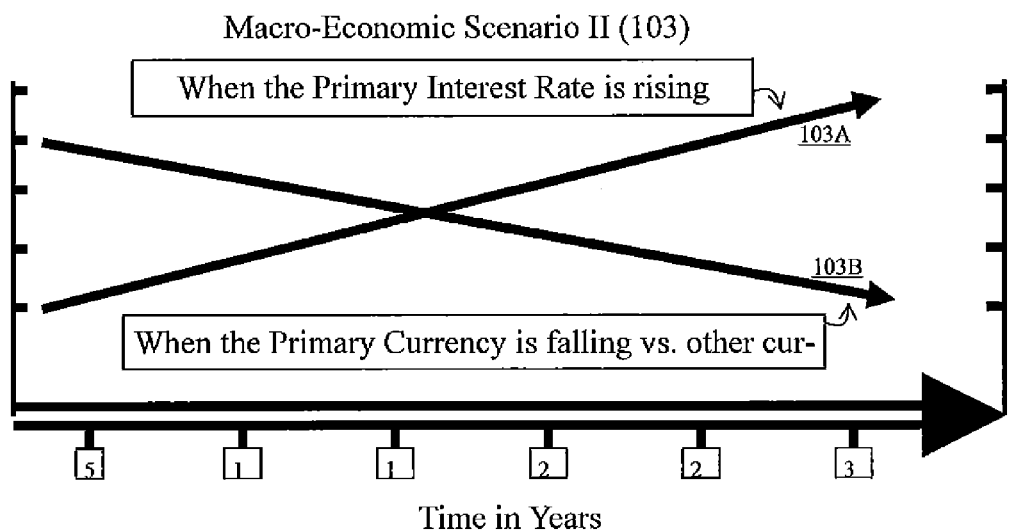
FIG. 1C
FIG. 1D
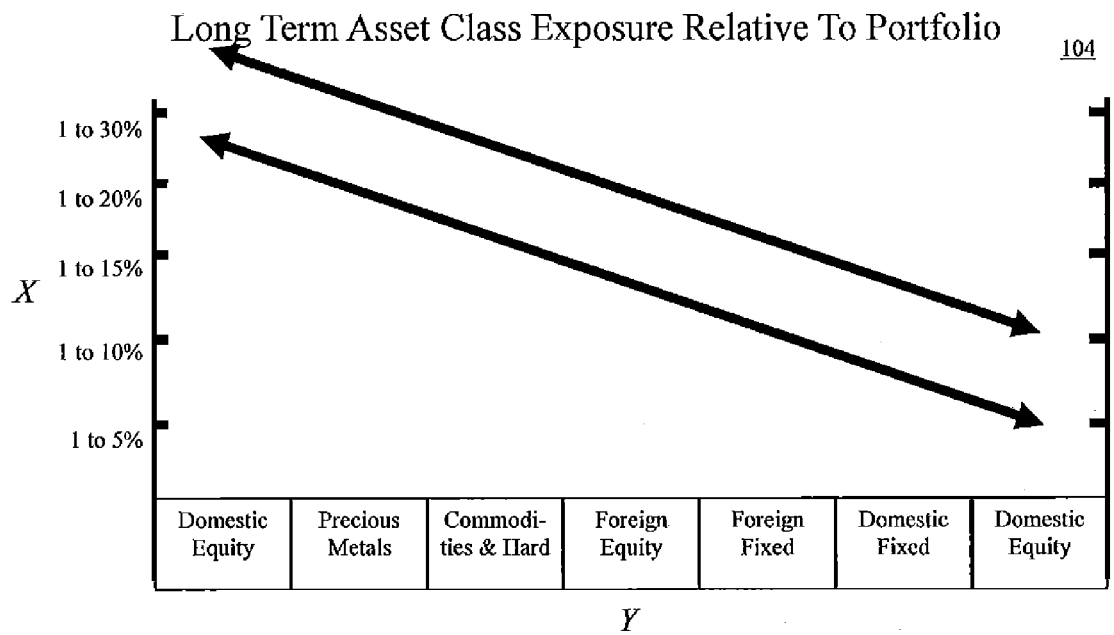

| 702 PRIMARY CURRENCY | 703 PRIMARY INTEREST RATE | 704 PRECIOUS METALS | 705 FOREIGN EQUITY | 706 DOMESTIC EQUITY | 707 DOMESTIC FIXED INCOME | 708 FOREIGN FIXED INCOME | 709 COMMODITIES AND HARD ASSETS | 710 DOMESTIC EQUITY INVERSE |
|---|---|---|---|---|---|---|---|---|
| DAILY BENCHMARK VALUATION VS. FOREIGN CURRENCIES | DAILY VALUATION/PRICING | DAILY VALUATION/PRICING | DAILY VALUATION/PRICING | DAILY VALUATION/PRICING | DAILY VALUATION/PRICING | DAILY VALUATION/PRICING | DAILY VALUATION/PRICING | DAILY VALUATION/PRICING |
| LONG TERM DIRECTIONAL MOVEMENT | LONG TERM DIRECTIONAL MOVEMENT | DIRECTIONAL MOVEMENT | DIRECTIONAL MOVEMENT | DIRECTIONAL MOVEMENT | DIRECTIONAL MOVEMENT | DIRECTIONAL MOVEMENT | DIRECTIONAL MOVEMENT | DIRECTIONAL MOVEMENT |
| DIRECTION RELATIVE TO PRIMARY INTEREST RATE | DIRECTION RELATIVE TO PRIMARY CURRENCY | | | | | | | |
| | | INVESTMENT MANAGER PERFORMANCE | INVESTMENT MANAGER PERFORMANCE | INVESTMENT MANAGER PERFORMANCE | INVESTMENT MANAGER PERFORMANCE | INVESTMENT MANAGER PERFORMANCE | INVESTMENT MANAGER PERFORMANCE | INVESTMENT MANAGER PERFORMANCE |
| | INTEREST RATE/RATE OF RETURN | | | | INTEREST RATE/RATE OF RETURN | INTEREST RATE/RATE OF RETURN | | |
| | | ALLOCATION VS. PEERS | ALLOCATION VS. PEERS | ALLOCATION VS. PEERS | ALLOCATION VS. PEERS | ALLOCATION VS. PEERS | ALLOCATION VS. PEERS | ALLOCATION VS. PEERS |
| HISTORIC VALUATION/PRICES | HISTORIC VALUATION/PRICES | HISTORIC VALUATION/PRICES | HISTORIC VALUATION/PRICES | HISTORIC VALUATION/PRICES | HISTORIC VALUATION/PRICES | HISTORIC VALUATION/PRICES | HISTORIC VALUATION/PRICES | HISTORIC VALUATION/PRICES |

FIG. 5

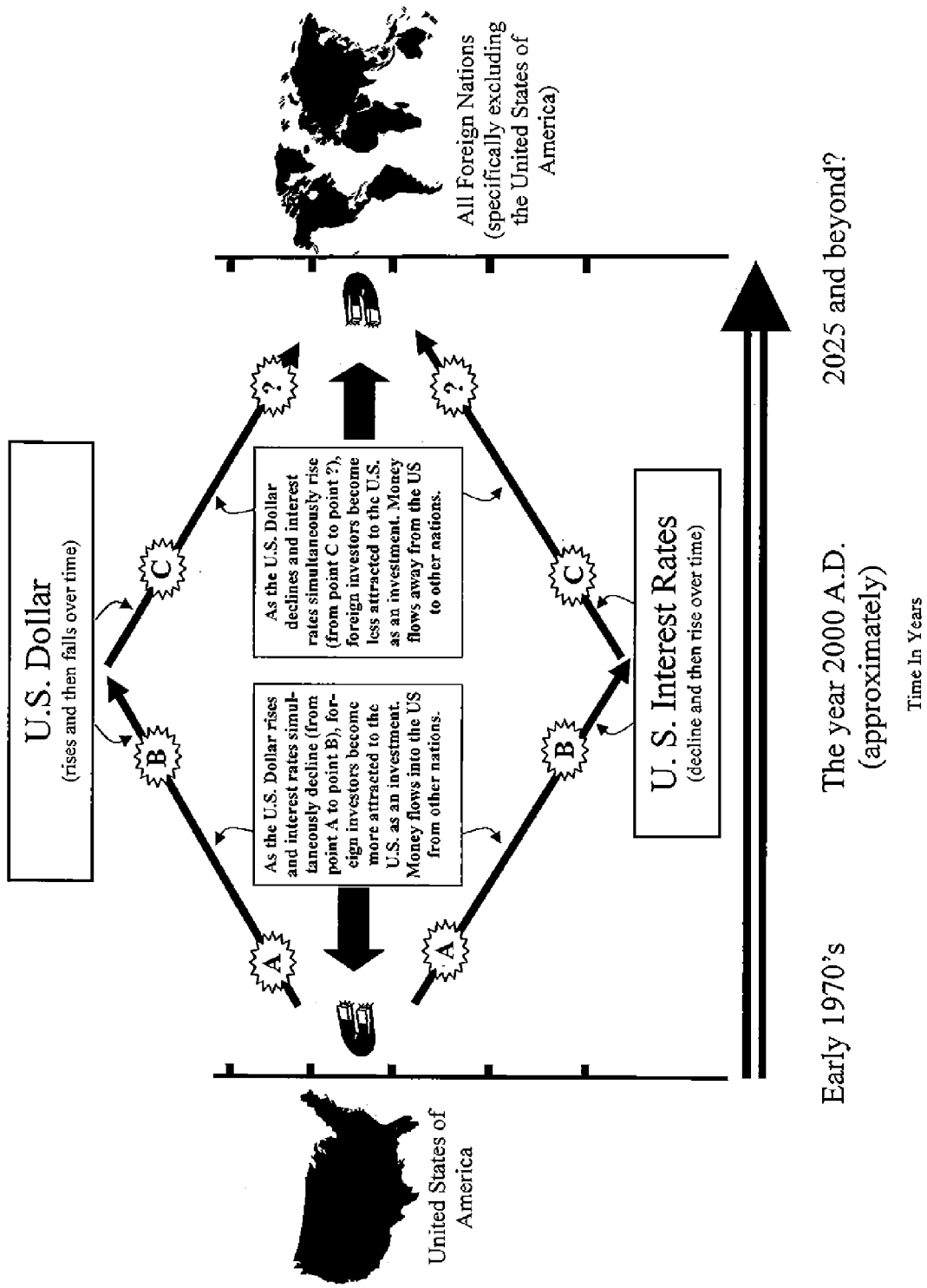

SYSTEMS AND METHODS TO ALLOCATE RELEVANCY OF GLOBAL ASSET PEERS

CROSS REFERENCE TO RELATED APPLICATIONS

This application is a continuation-in-part of U.S. patent application Ser. No. 11/591,212, filed Nov. 1, 2006, now abandoned, which claims the benefit of U.S. Provisional Patent Application No. 60/801,630 filed May 18, 2006.

FIELD

The present invention relates to computerized apparatus and methods for implementing allocation of portfolio assets amongst global peers. In particular, the present invention relates to apparatus and methods to monitor particular trends in currency relationships and interest rate movement and correlate investment in particular asset classes according to the results of the monitoring.

BACKGROUND

As a result of the volatility of the various global financial markets since the year 2000, a heightened sense of public awareness to volatility and stock market risk has emerged. Further analysis suggests that even though substantial stock market price corrections have recently occurred, continued erosion of domestic and global economic conditions remain a possibility. Evidence for this is borne in the history of credit bubbles, for which documented record exists since approximately 900 A.D. Although the proven attributes of Modern Portfolio Theory exist, there remain weaknesses in that model (even by admission of its creator, Dr. Harry Markowitz). Detailed research from many sources scouring data over several centuries have revealed that the last century alone may not provide sufficient data to accurately assess and implement a successful, long-term investment strategy. The investment model contained herein has been prepared using generally accepted principles from Modern Portfolio Theory but also include ten additional prior centuries of economic activity as well as the inclusion of additional asset classes.

SUMMARY

To address problems inherent in the prior art, some embodiments of the present invention introduce apparatus and methods to facilitate allocation of fund assets amongst asset classes including: equity inverse assets, precious metal assets, commodities and hard assets, foreign equity, foreign fixed income, domestic fixed income and domestic equity assets.

Embodiments can therefore include apparatus, methods, stored instructions and means to facilitate processing information related to one or more asset classes according to the methods and relationships provided by the present invention, as well as a method for interacting with a network access device to implement various inventive aspects of the present invention.

With these and other advantages and features of the invention that will become hereinafter apparent, the invention may be more clearly understood by reference to the following detailed description of the invention, the appended claims, and the drawings attached herein.

The Global Total Return Portfolio

Objectives:

The objective of this proposal is to expand the scope of Modern Portfolio Theory and acknowledge, anticipate and profitably navigate economic, social, and geopolitical forces that influence global financial markets and have repeated themselves many times over many centuries and which have had a direct impact on the values of various asset classes over that time frame.

Methodology:

Various studies have been conducted by both contemporary and historic economic and financial market observers over several centuries. The generally accepted principles of Modern Portfolio Theory concern themselves with both time in the market and diversification. Their limitations may include (although certainly not limited to) a specific, historically documented time frame during which stock market data is readily achieved (i.e. most of the twentieth century).

The formal stock market we know today has its roots in the late 19th century. Therefore, data is not available beyond nearly 120 years of history since it simply doesn't exist prior to that time. As a result, investment models that are based upon such data may be subject to an unknown set of convergences that may or may not have occurred during the approximate 120 years that data is known.

Although stock market records are not readily available prior to the 1880 time frame, various economic, socioeconomic, geopolitical, and otherwise patterned human behavior (notably generational in nature) does exist. It is well documented that economic dominance and wealth transfer has constantly been in motion over the centuries from one nation/state to another. Currency values and trends have been both long-term in nature (in many cases lasting several decades) and reflective of such wealth transfer.

This proposed investment model begins with the strengths of Modern Portfolio Theory and expands this foundation to identify historic timeframes where similar convergences of economic activity have previously occurred. This not only requires diversification into the traditional asset classes of domestic equity and debt instruments, but also includes equity and debt instruments of various established economies, as well as diversification into 'hard assets' such as oil, iron ore, copper, gold, and various other commodities. Much like the findings of Modern Portfolio Theory, further diversification in this manner also attempts to reduce overall portfolio risk while providing discernable enhancement to performance over time.

Between the late 1970s through the early 2000's, the United States was an international investment magnet for two reasons, as with reference to FIG. 6:

At points A in the late 1970's and early 1980's, when foreign investors chose to deposit their investment dollars into the United States, they did so at an exchange rate that was a mere fraction of the subsequent future exchange rate as the U.S. Dollar rose to point B and beyond. As the U.S. Dollar rose, the value of their investment rose (all other considerations not withstanding). This compounded their returns even more! Currency trends are historically multi-decade trends. Today U.S. investors have the opportunity to capitalize on a declining U.S. Dollar (at points C) by investing overseas in much the same manner that foreigners had during the past 25 to 30 years by investing here.

At points A in the late 1970's and early 1980's interest rates were uncommonly high in the U.S. A foreign investor had the opportunity to purchase high quality bonds that carried high coupons.

As interest rates declined during the subsequent years to points B (while the U.S. Dollar rose), those investors experienced capital appreciation of the face value of their bonds while continuing to receive high cash flows. The rising Dollar compounded their returns even more.

As FIG. 6 shows, from the late 1970's to the 2001 time frame, the US Dollar had experienced general strength versus other currencies. As well, beginning in the early 1980's and up to about the turn of century, interest rates in the U.S. have experienced a general decline. This environment attracted substantial foreign money. If, for instance, in the early 1980's a foreign investor had the inclination to invest into U.S. bonds, three economic forces have had a positive influence on that money:

Investing in bonds paying high coupons created very attractive cash flows.

As interest rates experienced an overall decline during subsequent years, the face value of the bonds experienced an overall increase, providing additional total return.

As the US Dollar experienced a general rise in value versus a foreign depositors own currency (point A to point B in FIG. 6), the investment return was even further enhanced due to the more favorable exchange rate upon the return of that money to its homeland.

Today, the shoe is essentially on the other foot. US investors (at point C) have the ability to capitalize on the declining US Dollar by investing in high quality foreign government debt instruments whose current coupons are more attractive than our own and further enhance their return as that foreign country's own currency becomes more valuable than the US Dollar. Today's American investors may recall conversations or personal experiences during the 1980's and 1990's when foreign investing may not have been a productive experience at that time. This was due primarily to the strengthening US Dollar inhibiting productive returns during that time frame. Today, foreigners investing here in the US are experiencing those same inhibited returns that US investors experienced by investing overseas during the 1980's and 1990's.

There are also several economic activities occurring today that research shows have converged at various points in time over the past several centuries. Those activities include large trade deficits and current account deficits, high levels of consumer, corporate and government debt, low consumer savings rates, low and steady interest rates, a declining domestic currency, and increasing commodity values.

The Global Total Return model is offered to assist with an ever changing world and, likely more challenging investment environment. The stock market isn't the only place where attractive, long term returns can be found. Investments in areas such as precious metals, foreign fixed income and commodities are used to effectively hedge domestic stock and bond market returns.

Limitations:

Traditionally, investing into a global portfolio has been a more daunting task than it is today. The advent of technology, not only in its use of building and testing portfolios but in the use of measuring relative currency movement, feasible management of transactions into and out of foreign countries, and management of geopolitical risks on a day to day basis may be a primary reason it can be done in today's environment.

For a single manager to be adept at assessing and monitoring a global portfolio even today would require extensive capabilities in all of the above mentioned concentrations: the movement of dozens of various currencies and their impact on those countries bond and stock issuers should prove stressful enough if it weren't for the addition of geopolitical risks. Using several money managers that specialize in those areas is required.

BRIEF DESCRIPTION OF THE DRAWINGS

FIG. 1A is a block diagram overview of a GAP system macro-economic scenario.

FIG. 1B is a block diagram overview of a GAP system long term asset class exposure relative to portfolio.

FIG. 1C is a block diagram overview of an alternative GAP system macro-economic scenario.

FIG. 1D is a block diagram overview of an alternative GAP system long term asset class exposure relative to portfolio.

FIG. 5 is a tabular representation of a portion of a GAP information database according to some embodiments of the present invention.

FIG. 6 is a chart illustrating the U.S. dollar and U.S. interest rates over time with relation to foreign investing.

DETAILED DESCRIPTION

Figure 2:
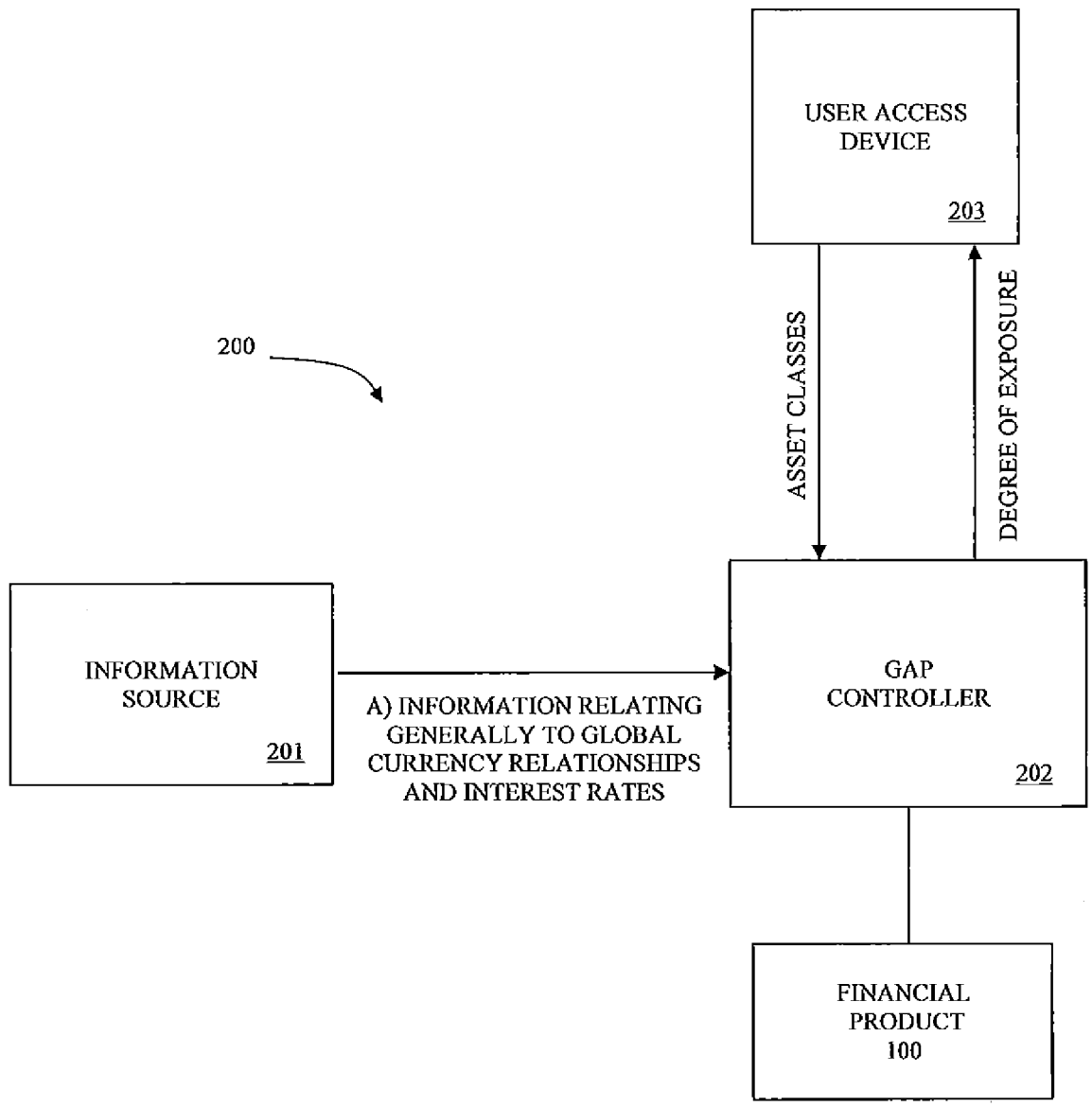
FIG. 2 is a block diagram overview of a GAP system according to some embodiments of the present invention.

This application is related, generally and in various embodiments, to enhanced financial methods, products, and systems for managing financial assets. Embodiments of the present invention include apparatus and methods to determine investment levels in multiple predetermined asset classes based upon a predetermined correlation with currency and interest rate indicators and an analysis of whether a current trend is short term or long term.

Definitions

In order to better describe the present invention, the following definitions will apply to the listed terms:

Currency: a unit of exchange for economic transactions; a medium of exchange defining an economic value commonly accepted and which is circulated within an economic system.

Currencies: a multiple variety of units of exchange for economic transactions; a multiple variety of mediums of exchange defining an economic value commonly accepted and which are circulated within and or between more than one economic systems and or nations.

Domestic Currency: a unit of exchange for economic transactions within a domestic economy; a medium of exchange defining an economic value commonly accepted within one's own economy and or nation and which is circulated within that particular economic system.

Foreign Currency: a unit of exchange for economic transactions within a separate or foreign economy; a medium of exchange defining an economic value commonly accepted within an economy and or nation other than one's own economy and or nation and which is circulated primarily within that particular economy or nation.

Benchmark Currency: a unit of exchange for economic transactions which is universally accepted by multiple economies; the currenly upon which value is commonly accepted and which is circulated within a variety of or between several economies and or nations.

Interest Rate: the price a bower pays for the use of money they do not own, expressed in nominal teams (i.e., without concern for inflation).

Interest Rates: a multiple variety of prices paid by a multiple number of bowers from as many lenders for the use of monies they do not own; a generally defined or homogenous point of reference representing the collective as well as to associate a general direction of trend of higher or lower present past or future value, expressed in nominal terms (i.e., without concern for inflation).

Domestic Interest Rate: the price a bower pays within one's own economy and or nation for the use of money they do not own, expressed in nominal terms (i.e., without concern for inflation).

Foreign Interest Rate: the price a bower, domiciled in an economy or nation other than one's own economy and or nation for the use of money they do not own, expressed in nominal terms (i.e., without concern for inflation).

Primary Currency: the currency being used by any individual domiciled in a particular economy and or nation and in which domestic trade, including the utilization of this investment model occurs, using the domestic currency as defined above. The Primary Currency for purposes herein is the U.S. Dollar.

Primary Interest Rate: the Domestic Interest Rate being used by any individual domiciled in a particular economy and or nation and in which domestic trade, including the utilization of this investment model occurs. For purposes of this investment model, the Primary Interest Rate is expressly defined as the interest rate associated with a debenture offered by the United States Treasury which matures in exactly 10 years from the date of issuance and is sometimes referred in an exemplary fashion herein as the U.S. interest rate.

Portfolio Peer: one member of a group of financial assets which, by definition of status, maintains an equal standing with all other members of that portfolio group.

Financial Product: an investment vehicle which may represent a specific asset class or investment style or both into which an investor may contribute money for investment purposes.

Domestic Equity Inverse: a financial product whose investment objective or underlying security inversely correlates with the daily performance of an equity security, equity index or other definable basket of equities.

Precious Metals: tangible metal assets such as platinum, gold, and silver that concentrate a great deal of value into a small amount of weight and volume.

Commodities: an item used in commerce which has economic value and is generally derived from agriculture or mining activities.

Hard Assets: a term defining several asset classes or companies involved in exploring for, producing, or distributing precious metals, natural resources, real estate or commodities.

Foreign Equity: Common stock issued by a corporation domiciled outside of the United States which represents an ongoing ownership interest in that company and is and generally available for trade on a daily basis on one or more of several foreign stock exchanges.

Foreign Fixed Income: Promissory investment vehicles issued by corporations and governments which are domiciled outside of the United States and offer periodic interest payments and repayment of the investors principle investment.

Domestic Fixed Income: Promissory investment vehicles issued by corporations and governments which are domiciled in the United States and offer periodic interest payments and repayment of the investors principle investment.

Domestic Equity: Common stock issued by a corporation domiciled in the of United States which represents an ongoing ownership interest in that company and is generally available for trade on a daily basis on one or more of several domestic and foreign stock exchanges.

Secular: a period of time measurement used to express a long expanse of time generally measured in decades rather than years.

Cyclical: a period of time measurement used to express an intermediate expanse of time generally measured in years or even months rather than decades.

The figures and descriptions of the disclosed invention have been simplified to illustrate elements that are relevant for a clear understanding of the disclosed invention. It should be understood that the methods, products, and systems described below may include various other processes, components, and elements in actual implementation.

Referring now in detail to the drawings, FIG. 1 is a block diagram of a Global Asset Peers (GAP) system 100 according to some embodiments of the present invention. In one general respect, this application discloses a financial product 100.

According to various embodiments, the financial product 100 includes multiple components referred to as portfolio peers, and in some embodiments can include the seven peers listed in FIGS. 1A, 1B, 1C and 1D. The financial product 100 can therefore include a mix of the seven components, wherein the ratio of each component, one to another correlates with one or more indications of long term trends in currency and interest rates and predetermined programmed relationships. For example, in the graphical representation 100, the Primary Currency, which is the U.S. currency, can rise 101 and the Primary Interest Rate, which is the U.S. interest rate, can fall 101A.

At 102, if macro economic conditions defined in 100 exist, then, portfolio weightings of peers along the 'x' (horizontal) axis increase from left to right and are allocated among the portfolio within an upper and lower range as defined by the 'y' (vertical) axis.

At 103, the Primary currency, which is U.S. currency, can fall 103B and the Primary Interest Rate, which is the U.S. interest rate, can rise 103A.

At 104, if macro economic conditions defined in 103 exist, then, portfolio weightings of peers along the 'x' (horizontal) axis decrease from left to right and are allocated among the portfolio within an upper and lower range as defined by the 'y' (vertical) axis.

In another general respect, this application discloses a computerized financial system configured to receive data indicative of long-term trends for currency and interest rates and generate recommended ratios of investment in seven or more portfolio peers.

For each of the seven asset classes described above there exists one or more relationships. In the descriptions below, various embodiments include relationships among portfolio peers as described.

a) Embodiments can include a defined relationship between each member of the peer group and the direction of the Primary Interest Rate.

b) Embodiments can include a defined relationship between each member of the peer group and the direction of the relative value of the Primary Currency.

c) Each member of the peer group has a definable relationship with at least one other member of the peer group.

Accordingly, for one or more asset classes (peer members), embodiments can include a determining factor in selection of a third party manager that includes the ability of a third party manager assigned to manage a quantity of investment funds representing exposure to one of the asset classes (peer members) and that particular asset managers' ability to recognize any or all of the above three relationships and, in turn add performance value to the investment funds.

Domestic Inverse Equity

Following in the description below, various Third Party Managers' Objectives are described. For example, relationships among portfolio peers and third party manager objectives can include the following exemplary embodiments for various Asset Classes.

Relationship Among Portfolio Peers: According to some implementations of the present invention, Domestic Equity Inverse financial products will generally maintain a direct correlation with the direction of interest rates of debenture securities issued by the United States Treasury. In addition, according to the present invention, Domestic Equity Inverse financial products generally maintain an inverse correlation with the direction of the relative value of the Primary Currency.

The Domestic Equity Inverse asset class has a direct but opposite (inverse) correlation with that of the Domestic Equity asset class. An equally opposite relationship exists when, for each unit of measurement in the increase of one of the two asset classes, there will be an approximately equal and opposite decrease of value for a unit of measurement for the other. For example, if Domestic Equity were to rise by 5%, then the Equity Inverse will decline by 5%, and visa versa.

Third Party Managers' Objective: According to some implementations of the present invention, the objective of a manger charged with overseeing management duties of a Domestic Equity Inverse asset class can include obtaining a positive inverse relationship with the Domestic Equity class. Generally, a positive inverse relationship exists when, for each unit of measure, that Domestic Equity increases, a lesser unit of measure of decline will occur for the value of the Domestic Equity Inverse asset class and that for each unit of measure of decline in value for the Domestic Equity class that a relative greater increase in value of the Domestic Equity Inverse class will occur. By way of non-limiting example, if Domestic Equity were to rise by 5%, then Equity Inverse will decline by less than 5% (i.e. 4.9% or less). Conversely, should Domestic Equity decline by 5% then Domestic Equity Inverse should rise by more than 5% (i.e. 5.1% or more).

By way of non-limiting example, the following implementations exemplify some embodiments of the present invention.

Investment Manager 1: Assets are either 100 percent exposed only in a short investment strategy or are invested in cash and short term cash equivalents used to leverage the purchase of short positions of various assets. The manager seeks capital appreciation and current income. The manager follows an asset-allocation strategy that shifts among a wide range of investments and market sectors. It may invest in domestic stocks, foreign stocks (up to 65% of assets), convertible and nonconvertible debt, and money-market instruments.

Precious Metals

Relationship Among Portfolio Peers: Precious Metals will generally maintain a direct correlation with the direction of interest rates of debenture securities issued by the United States Treasury. Precious Metals will generally maintain an inverse correlation with the direction of the relative value of the Primary currency, which is United States Currency.

In terms of direction, and not with regard to magnitude, Precious Metals have historically maintained relationships over prolonged periods of time with both Domestic Equity and Foreign Equity.

There exists an inverse correlation between both Domestic and Foreign Equities and Precious Metals. Like all relationships defined in this application, the relationships are of a secular nature rather than of a cyclical nature. While a secular trend may exist between Precious Metals and Equities, shorter-term cyclical countertrends may emerge.

Third Party Managers' Objective: The objective of a manger charged with overseeing management duties of the Precious Metals Asset class is to capture more than 100% of the advance in the relative value of the underlying metals, while simultaneously capturing less than 100% of the decline in the relative value of Precious Metals on a cyclical basis.

Investment Manager 2: In some embodiments of the present invention, an investor's investment seeks capital appreciation. The manager invests between 80% and 100% of assets in mining securities and metal investments. It may invest in foreign securities. The manager may write covered call options and use various hedging techniques for defensive purposes. It may also invest in bullion. This fund is non-diversified.

Commodities and Hard Assets

Relationship Among Portfolio Peers: According to some embodiments, Commodities and Hard Assets will generally maintain a direct correlation with the direction of interest rates of debenture securities issued by the United States Treasury. Commodities and Hard Assets are predicted to generally maintain an inverse correlation with the direction of the relative value of United States Currency.

In terms of direction, and not with regard to magnitude, there has historically been a direct correlation between Commodities and Hard Assets (including Energy Commodities such as Crude Oil, Heating Oil, Natural Gas, Gasoline, Coal Food Commodities such as cattle, hogs, corn, grains, beans, cocoa, milk, coffee, orange juice and sugar, Industrial Commodities such as lumber, cotton, copper, aluminum and palladium, Hard Assets such as land, timber) versus Precious metals and an inverse correlation with Domestic Fixed Income. According to some embodiments, these relationships are treated as secular versus cyclical.

Third Party Managers' Objective: The objective of a manager charged with overseeing management duties of Commodities and Hard Assets is to capture more than 100% of the advance in the relative value of the underlying securities, while simultaneously capturing less than 100% of the decline in the relative value of those same securities on a cyclical basis.

Investment Manager 3: In some embodiments, an investment manager seeks total return. The manager invests at least 65% of assets in hybrid instruments that are commodity-linked derivative instruments, mainly structured notes, and investment-grade and non-investment-grade corporate bonds and notes; securities issued or guaranteed by the U.S. government or its agencies, including mortgage-backed securities, forward rolls, repurchase agreements, futures contracts, options, interest-rate swaps, forward contracts, and asset-backed securities. This portfolio is non-diversified.

Foreign Equity

Relationship Among Portfolio Peers: In some embodiments, Foreign Equity will generally maintain an inverse correlation with the direction of interest rates of debenture securities issued by the United States Treasury. Foreign Equity will generally maintain an inverse correlation with the direction of the relative value of United States Currency.

For an investor domiciled in the United States, a declining domestic currency may provide significant enhancement to Foreign Equity securities issued by foreign nations while simultaneously diminishing the value of Domestic Equity securities (relative to a foreigners ownership of the same securities). For an investor domiciled in the United States, a rising domestic currency may provide significant enhancement to Domestic Equity securities (relative to a foreigners ownership of the same securities) while simultaneously diminishing the value of Foreign Equity.

Third Party Managers' Objective: The objective of a manager charged with overseeing management duties of Foreign Equities is to capture more than 100% of the advance in the relative value of the underlying securities, while simultaneously capturing less than 100% of the decline in the relative value of those same securities on a cyclical basis. May own both Long and Short positions in equity securities, primarily common stocks of companies located any where in the world (other than the United States), including developing or emerging markets.

Investment Manager 4: In some embodiments, the investment manager should seek long-term capital appreciation in both up and down markets with less volatility than the overall global stock market. Under normal market conditions, the manager will have both long and short positions in equity securities, primarily common stocks of companies located anywhere in the world, including developing or emerging markets. It will invest in at least three different countries, which may include the United States. The effects of being both long and short simultaneously mitigate the risks of leverage.

Foreign Fixed Income

Relationship Among Portfolio Peers: In still other embodiments, Foreign Fixed Income values generally maintain an inverse correlation with the direction of interest rates of debenture securities issued by the United States Treasury. Foreign Fixed Income values will generally maintain an inverse correlation with the direction of the relative value of United States Currency.

For an investor domiciled in the United States, a declining domestic currency may provide significant enhancement to the value of Fixed Income securities issued by foreign nations while simultaneously diminishing the value of Fixed Income securities (relative to a foreigners ownership of the same securities). For an investor domiciled in the United States, a rising domestic currency may provide significant enhancement to Domestic Fixed Income securities (relative to a foreigners ownership of the same securities) while simultaneously diminishing the value of Foreign Fixed Income.

Third Party Managers' Objective: The objective of a manager charged with overseeing management duties of Foreign Fixed Income is to capture more than 100% of the advance in the relative value of the underlying securities, while simultaneously capturing less than 100% of the decline in the relative value of those same securities on a cyclical basis. May own both Long and Short positions in equity securities, primarily common stocks of companies located any where in the world (other than the United States), including developing or emerging markets.

Investment Manager 5: Some embodiments include an investment that seeks total return consistent with preservation of capital. The fund normally invests at least 65% of assets in debt securities, including U.S. government securities, corporate bonds, and mortgage-related securities. It may invest up to 30% of assets in securities denominated in foreign currencies. The fund may invest up to 10% of assets in high-yield securities rated B or higher. The portfolio duration generally ranges from three to six years.

Investment Manager 6: Additional embodiments include an investment manager that seeks total return. The fund normally invests at least about 80% of assets in fixed income securities issued in at least three foreign countries. A portion of these securities may be represented by options and futures contracts. The portfolio may include government debt, corporate debt, and mortgage- and asset-backed securities. The fund may invest up to 10% of assets in debt rated below BBB but not lower than B. The average portfolio duration normally varies from three to seven years. This fund is non-diversified and employs a strategy to hedge against U.S. Currency exchange rate risk.

Investment Manager 7: Some embodiments include an investment that seeks current income, capital appreciation, and growth of income. The fund invests at least about 80% of net assets in "bonds," it includes debt securities of any maturity, such as bonds, notes and debentures. It may invest up to 25% of total assets in non-investment grade bonds. The fund also may invest a significant portion of assets in emerging markets. The fund is nondiversified.

Investment Manager 8: In some embodiments, an investment manager seeks total return; income is a secondary consideration. The portfolio ordinarily invests at least 80% of assets in bonds and invests in at least three countries other than the United States. It can invest without limit in securities below investment grade (commonly called "junk bonds") to seek total return and higher income. The fund is nondiversified.

Domestic Fixed Income

Relationship Among Portfolio Peers: In some embodiments, Domestic Fixed Income values generally maintain an inverse correlation with the direction of interest rates of debenture securities issued by the United States Treasury. Domestic Fixed Income values will generally maintain a direct correlation with the direction of the relative value of the Primary Currency.

Third Party Managers' Objective: In still other embodiments, the objective of a manager charged with overseeing management duties of Domestic Fixed Income assets include capturing more than 100% of the advance in the relative value of the underlying securities, while simultaneously capturing less than 100% of the decline in the relative value of those same securities on a cyclical basis.

Investment Manager 9: Embodiments also include models wherein assets are invested in intermediate term, investment grade taxable fixed income with a total return (income and capital appreciation) objective. The investment manager seeks primarily current income consistent with preservation of capital. The investment manager normally invests at least 80% of assets in bonds. It normally invests at least 60% of assets in bonds and debt securities rated A or better at the time of purchase. The portfolio manager will not invest more than 40% of assets in other debt obligations, including lower-rated bonds. It may also hold cash or money market instruments. The total return approach requires the employment of defensive strategies when interest rates are rising, thereby hedging core positions.

Investment Manager 10: In some additional embodiments, an investment manager seeks maximum real return. The manager normally invests at least 80% of assets in inflation-indexed bonds of varying maturities issued by the U.S. and non-U.S. governments, their agencies, and corporations. The manager invests primarily in investment grade securities, but may invest up to 20% of its assets in high yield securities rated B or higher. It may also invest up to 30% of its assets in securities denominated in foreign currencies. This portfolio should be nondiversified.

Domestic Equity

Relationship Among Portfolio Peers: In Domestic Equity embodiments, securities will generally maintain an inverse correlation with the direction of interest rates of debenture securities issued by the United States Treasury. Domestic Equity securities will generally maintain a direct correlation with the direction of the relative value of the Primary Currency.

Third Party Managers' Objective: The objective of a manger charged with overseeing management duties of Domestic Equity assets is to capture more than 100% of the advance in the relative value of the underlying securities, while simultaneously capturing less than 100% of the decline in the relative value of those same securities on a cyclical basis.

Investment Manager 11: In some embodiments, an investment manager pursues total return. The manager invests in a diversified portfolio of common stocks. High quality stocks with a 'buy and hold' discipline are managed. The manager sells index call options on the S&P 500 index and other stock indexes, and, when appropriate, enters into closing purchase transactions with respect to such options. The fund also includes index put options that can protect the fund from a significant market decline over a short period of time.

Worldwide Balanced Allocation

Relationship Among Portfolio Peers: In still other embodiments, a Worldwide Balanced Allocation includes a combination of four investment objectives (portfolio peers) comprising:

Foreign Equity
Foreign Fixed Income
Domestic Fixed Income
Domestic Equity

Descriptions of each of the Relationships Among Portfolio Peers can be found in the correspondent descriptions listed above.

Third Party Managers' Objective:

Third Party Managers' Objectives are described in the correspondent descriptions for the objectives listed above. A single Third Party Manager in one combined portfolio can achieve one or more of the objectives.

Investment Manager 12: Some embodiments also include a portfolio wherein an investment seeks current income and growth of capital. The manager invests primarily in a broad range of income-producing securities, including stocks and bonds. It normally invests at least 90% of assets in income-producing securities with at least 50% of assets in common stocks. The manager may also invest up to 40% of assets in securities of issuers domiciled outside of the U.S. It may also invest in preferred stocks, convertibles, bonds and cash or money market instruments.

Investment Manager 13: The investment seeks income while maintaining prospects for capital appreciation. The manager normally invests in a diversified portfolio of debt and equity securities. It may invest up to 100% of total assets in debt securities that are rated below investment-grade. The manager seeks income by selecting investments such as corporate, foreign and U.S. Treasury bonds, as well as stocks with attractive dividend yields.

Investment Manager 14: Some embodiments can also include a portfolio wherein an investment manager seeks long-term capital growth. The fund normally invests in common stocks of U.S. and foreign companies. It reserves the right to invest a portion of its assets infixed-income securities of domestic or foreign issuers, which appear to offer potential for long-term growth of capital. The portfolio may hold a portion of assets in short-term debt instruments including commercial paper and certificates of deposit. It may invest in 'structured securities' in which the value is linked to the price of an underlying instrument, such as a currency, commodity or index, and may also invest in precious metals.

Investment Manager 15: Some embodiments also include a portfolio wherein an investment seeks current income; capital appreciation is secondary. The manager allocates among common and preferred stocks, straight debt securities, convertibles, and cash equivalents. It normally maintains 60% of assets in equity-type securities. The portfolio may invest up to 20% of assets in debt securities rated Ba or below. It may invest up to 20% of assets in equity securities domiciled outside of the U.S and 10% of assets in debt securities of non-U.S. issuers.

Apparatus

Referring now to FIG. 2, a block diagram is presented illustrating basic components involved in the present invention. A GAP controller 202 (described in detail in FIG. 4) can access and analyze data available from an information source 201. A user access device 203, such as a personal computer or handheld computer or personal digital assistant, can be utilized by a user to cause executable software to run and implement trade or other actions which will implement one or more of the above objectives. The GAP controller 202 can access an information source 201 containing information, such as market data, currency data or other trading data used to compile a financial product 100.

Figure 3:
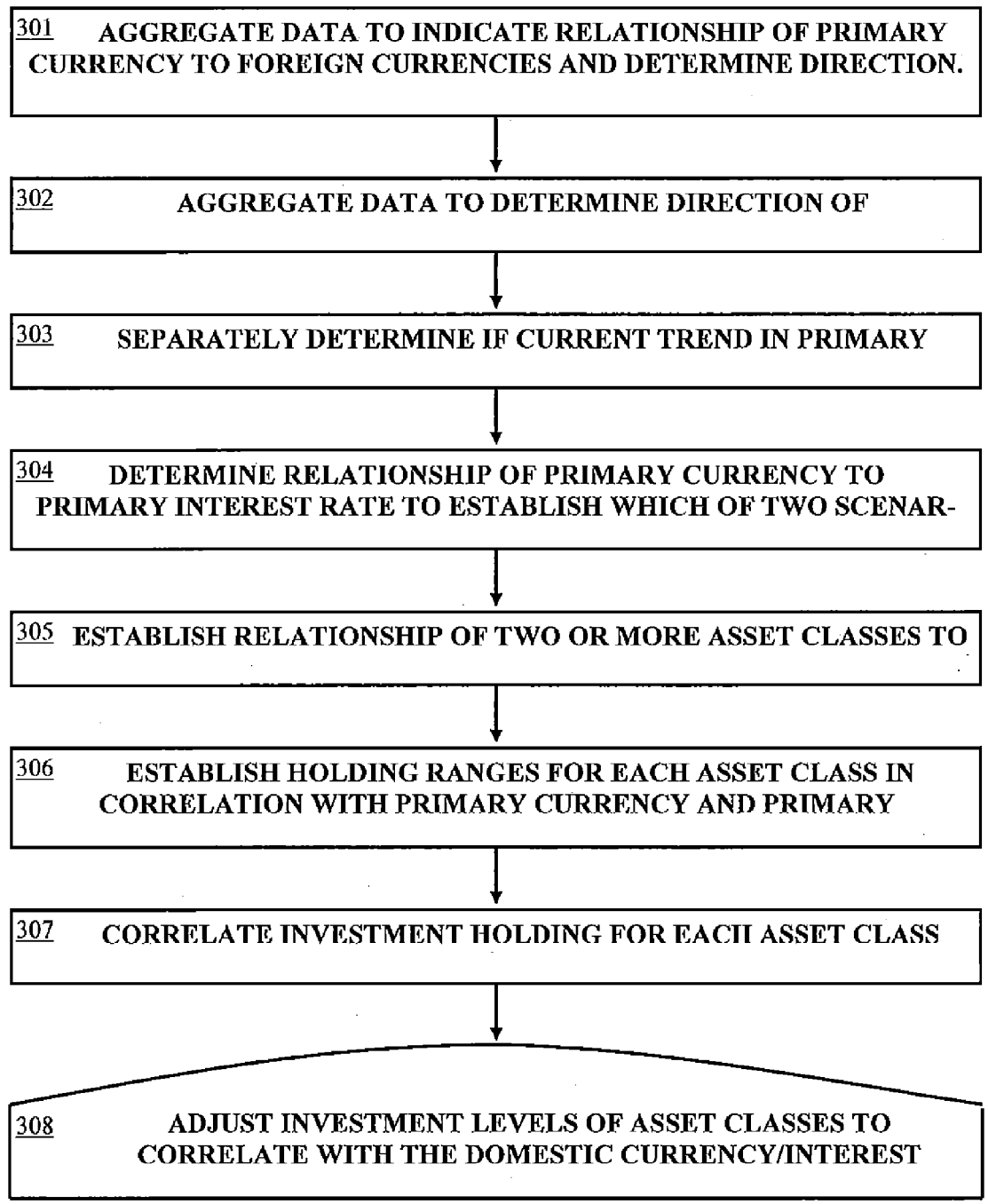
FIG. 3 is a flow chart of a method according to some embodiments of the present invention.

Referring now to FIG. 3, a flow diagram of steps that can be used to implement the present invention.

Consider James, who is a fund manager for a financial institution, and who receives a request from an investor to make in investment that will at least survive and preferably profit during an economic downturn in the U.S. market. James utilizes the GAP system to review the data relating to historical values of U.S. currency and interest rates.

James might start by asking himself some rather pointed questions. If the U.S. experiences an economic downturn, what will have been the causes for such a downturn? What forces will affect the financial markets? How will foreign governments, corporations and individual investors react? How will the U.S. government likely respond? How much value will an understanding of prior such occurrences provide? Are there any consistent circumstances or events under which such downturns have previously been initiated? James is aware that that there are several economic forces in play at all times. In order to meet his investors' request, he must understand the causes and effects of the flow of money from one nation/state to another and from one asset class to another. He must further understand how a change in any flow of money to or from any one member of the peer group will subsequently impact the remaining portfolio peers. He must do this in order to establish counterbalance measures using inversely correlated investments which are in turn used to reduce or off-set risks in at least one other member of the peer group and, as a result, experience rising overall portfolio values during adverse economic conditions.

The most obvious place for James to begin will be with a review of historic economic activity. This exercise will accomplish two things. The first will be to determine the existence of any previous similar occurrences. The second accomplishment will be a determination of whether any commonalities may exist among them.

Through detailed research, James will find that there is a history for the expansion and contraction of economic cycles dating back hundreds of years. Furthermore, he will discover that the one common circumstance to exist with nearly all of them was the buildup of large amounts of debt. Economic dominance shifted from one state/nation to the next in most cases through a combination of wars and changes in societal behavior.

Other commonalities among previous economic downturns included low personal savings rates, rising commodity prices, interest rates beginning to rise after long periods of decline, weak domestic currencies, large levels of consumer, corporate and government debt, large trade and current account deficits, rising bankruptcies, wars, government intervention and manipulation in order to appease society, and lastly endearing societal self esteem. He will find that nearly every credit bubble came into being on the heels of a societal mania stemming from the development of new products and services.

Now James is armed with an understanding of credit bubbles. He can see that when the Primary Currency declines, it means that money is leaving the country. Money always seems to travel where it is being treated best, and a declining exchange rate does not help keep a foreign investor's deposits in the U.S.

Why is the Primary Currency even declining to begin with? Because there are large amounts of domestic debt. Foreign investors will gradually feel less confident in the U.S. economy due to large quantities of debt. Presently, the U.S. Dollar is the world's fiat currency of choice (Benchmark Currency). The entire world has confidence in the Primary Currency as a medium of exchange. When that confidence begins to erode, the price of gold will rise as investors around the globe begin to search for alternatives that they feel comfortable holding.

So, if debt levels decline, the Primary Currency should strengthen, and gold should decline. If debt levels increase, the Primary Currency should continue to erode, and gold should rise. If money leaves the country, it will mean there will be sellers of U.S. equities (Domestic Equity), causing stock markets to decline. It will mean there will be sellers of U.S. bonds (Domestic Fixed Income), causing Interest Rates to rise.

Rising interest rates will slow an economy but may also be a reflection of some form of inflation, which is another reason why bond holders will become sellers. If inflation does exist, most commodities will rise.

Accordingly, the steps outlined in FIG. 3 can help facilitate a user, such as James, to utilize automated apparatus to create an investment that will provide favorable performance during an economic downturn in the U.S. market. At 301, a processor can aggregate indications and determine the long term relationship of the Primary Currency to various foreign currencies. At 302, it can determine the long term direction of U.S. Interest Rates (including the Primary Interest Rate). At 303 it can determine if the current trend in the Primary Currency and Primary Interest rate are long term. At 304 it can determine which of the following two circumstances exist. Either a) that on a long term basis, the value of the Primary Currency is rising relative to other currencies and that the Primary Interest Rate is falling or b) that on a long term basis, the value of the Primary Currency is falling relative to other currencies and that the Primary Interest Rate is rising (FIGS. 1A and 1C).

At 305 it can establish a relationship of two or more asset classes to Primary Currency/Primary Interest Rate indicators. For example, which if a) of 303 above exists, then increase domestic equity exposure, hold long duration Domestic Fixed Income versus short duration Domestic Fixed Income, reduce each of the following: gold and precious metals, commodities and hard assets, inverse equity, foreign fixed income and foreign equity exposures. In addition, if b) of 303 above exists, then decrease domestic equity exposure, hold short duration Domestic Fixed Income versus long duration Domestic Fixed income, increase each of the following: gold and precious metals, commodities and hard assets, inverse equity, foreign fixed income and foreign equity exposures.

At 306, it can establish holding ranges for each asset class in correlation with Primary Currency/Primary Interest Rate indicators. At 307, it can correlate investment holding for each asset class to current Primary Currency/Primary Interest Rate relationship and at 308, it can adjust levels of the asset classes to correlate with the Primary Currency/Primary Interest Rate relationship and determination of short/long-term trend.

Macro-Economic Scenario I

In some exemplary embodiments, a Macro-Economic Scenario I (defined as follows): A United States economic environment in which the value of the Primary Currency is rising relative to the currencies of the then current three largest trading partners and the Primary Interest Rate is simultaneously declining. These directional movements are to be considered long term by perhaps dozens of years in duration. Trends are considered to be in place provided no new high or new low price of these two components exceeds a high or low price of those same components established during any previous five-year period.

If Macro Economic Scenario I Prevails as defined above, then assets are allocated as follows:

Up to 35% and within a 5% variance into Domestic Equity Assets
Up to 35% and within a 5% variance into Domestic Fixed Income Assets
Up to 25% and within a 5% variance into Foreign Fixed Income Assets
Up to 25% and within a 5% variance into Foreign Equity Assets
Up to 20% and within a 5% variance into Commodities and Hard Assets
Up to 15% and within a 5% variance into Precious Metals Assets
Up to 10% and within a 5% variance into Domestic Equity Inverse Assets Macro-Economic Scenario II:

A United States economic environment in which the value of the Primary Currency is declining relative to the currencies of the then current three largest trading partners and the Primary Interest Rate is simultaneously rising. These directional movements are to be considered long term by perhaps dozens of years in duration. Trends are considered to be in place provided no new high or new low price of these two components exceeds a high or low price of those same components established during any previous five-year period.

Figure 4:
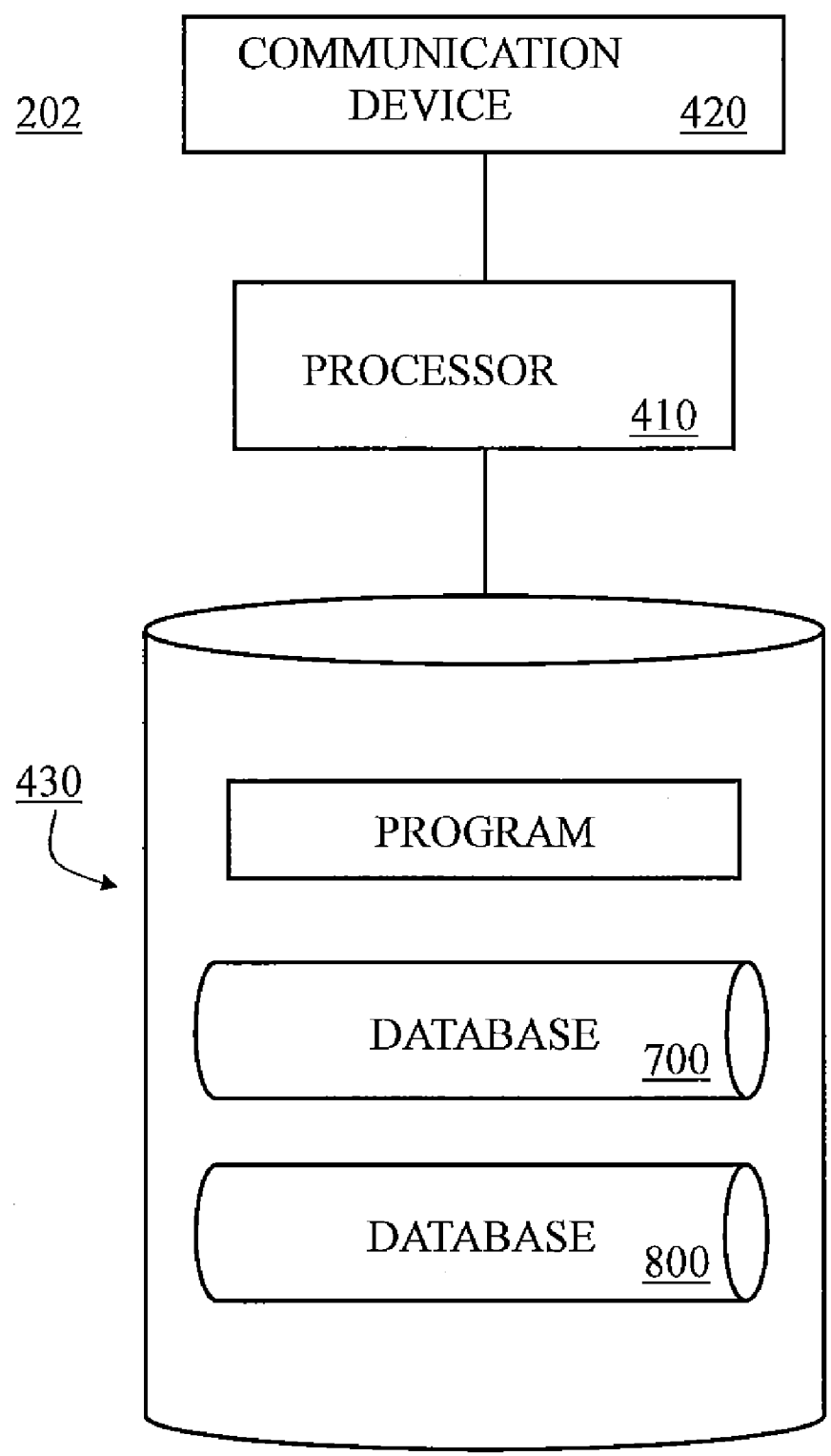
FIG. 4 is a controller for implementing some embodiments of the present invention.

If Macro Economic Scenario II Prevails as defined above, then, in some embodiments, assets can be allocated as follows:

Up to 10% and within a 5% variance into Domestic Equity Assets
Up to 15% and within a 5% variance into Domestic Fixed Income Assets
Up to 15% and within a 5% variance into Foreign Fixed Income Assets
Up to 20% and within a 5% variance into Foreign Equity Assets Up to 25% and within a 5% variance into Commodities and Hard Assets Up to 35% and within a 5% variance into Precious Metals Assets Up to 35% and within a 5% variance into Domestic Equity Inverse Assets Communication Controller FIG. 4 illustrates a GAP controller 202 that is descriptive of the devices shown, for example, in FIG. 2 according to some embodiments of the present invention. The GAP controller 202 comprises a processor 410, such as one or more INTEL® processors, coupled to a communication device 420 configured to communicate via a communication network (not shown in FIG. 4). The communication device 420 may be used to communicate, for example, with one or more network access devices.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. The storage device can be used to store one or more databases 700-800 including data according to the embodiments described above.

GAP Information Database

Referring to FIG. 5, a table represents the GAP information database 700 that may be stored at a GAP controller 202 according to some embodiments of the present invention. The table includes entries identifying values for U.S currency 702 (i.e., the U.S. Dollar) and the Primary Interest Rate 703. The table can also define precious metal 704, foreign equity 705, domestic equity values 706, Domestic Fixed Income values 707, Foreign Fixed income 708, Commodities and Hard Assets 709 and Domestic Equity Inverse 710. The information in the GAP information database 700 may be created and updated, for example, by the GAP controller 202 or a user.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many of the embodiments described herein are associated with a GAP controller facilitating GAP processing and filing, according to other embodiments network access devices or other devices can communicate with each other to perform functions described herein, (e.g., a fund manager can interact with a network access device and utilize an appropriate protocol, such as peer-to-peer communications, to transmit GAP related information to an trading party device).

As such, the embodiments described herein are associated with a GAP controller 202 performing a number of functions. According to other embodiments, some or all of these functions can instead be performed by any of the other devices described herein.

In various aspects, the investor or fund manager can be operatively associated with one or more computer systems and one or more data storage media. It can be appreciated that one or more of the computer systems and one or more of the data storage media (e.g., can be employed to communicate, store, analyze, and/or otherwise process data related to financial transactions occurring between and/or among the third party, the corporation, the depositary, the employee and/or the investor.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the disclosed invention as defined by the appended claims.

I claim:

1. A computerized apparatus for providing an investment ratio for multiple portfolio peers, the apparatus comprising:
   a processor configured to:
   receive an indication of a long-term trend in value for the Primary Currency relative to multiple foreign currencies;
   receive an indication of a long-term trend in the Primary Interest Rate;
   correlate an investment ratio for each of multiple portfolio peers with the long-term trend in the value for the Primary Currency relative to multiple foreign currencies and the long-term trend in the Primary Interest Rate, wherein the multiple portfolio peers include Domestic Equity, Domestic Equity Inverse, Domestic Fixed Income, Foreign Equities, Foreign Fixed Income, Precious Metals, Commodities and Hard Assets;
   adjust the investment ratio for each of the multiple portfolio peers based on the correlation, wherein when the value of the Primary Interest Rate is falling and the value for the Primary Currency is rising relative to the multiple foreign currencies then the adjustment includes increasing the investment ratio for the Domestic Equity and decreasing the investment ratio for the Domestic Equity Inverse, the Domestic Fixed Income, the Foreign Equities, the Foreign Fixed Income, the Precious Metals, the Commodities and the Hard Assets, and wherein when the Primary Interest Rate is rising and the value of the Primary Currency is falling relative to the multiple foreign currencies then the adjustment includes decreasing the investment ratio for the Domestic Equity and increasing the investment ratio for the Domestic Equity Inverse, the Domestic Fixed Income, the Foreign Equities, the Foreign Fixed Income, the Precious Metals, the Commodities and the Hard Assets; and
   generate an output comprising the adjusted investment ratio for each of the multiple portfolio peers.

2. The computerized apparatus of claim 1 wherein the processor is further configured to analyze an existing financial product comprising the multiple portfolio peers and generate one or more recommended trading orders for the financial product based on the generated output.

3. The computerized apparatus of claim 2 wherein the processor is further configured to calculate the adjusted investment ratio for each of the multiple portfolio peers on a daily basis.

4. The computerized apparatus of claim 1 wherein said indication of the long-term trend in the Primary Interest Rate is based on analysis of historical data indicative of the Primary Interest Rate over a predetermined number of preceding years; wherein said processor is further configured to determine whether the Primary Interest Rate exceeds any high for the Primary Interest Rate during the predetermined number of preceding years.

5. The computerized apparatus of claim 4 wherein said indication of the long term trend of the Primary Interest Rate is further based on analysis of historical data indicative of the Primary Interest Rate over a predetermined number of preceding years; wherein said processor is further configured to determine whether the Primary Interest Rate exceeds any low for the Primary Interest Rate during the predetermined number of preceding years.

6. The computerized apparatus of claim 5 wherein the predetermined number of preceding years comprises 5 years.

7. The computerized apparatus of claim 4 wherein the predetermined number of preceding years comprises 5 years.

8. The computerized apparatus of claim 1 wherein said indication of the long term trend of the Primary Interest Rate is based on analysis of historical data indicative of the Primary Interest Rate over a predetermined number of preceding years; wherein said processor is further configured to determine whether the Primary Interest Rate exceeds any low for the Primary Interest Rate during the predetermined number of preceding years.

9. The computerized apparatus of claim 8 wherein the predetermined number of preceding years comprises 5 years.

10. The computerized apparatus of claim 8 wherein said indication of the long term trend in the Primary Currency value versus multiple foreign currencies value is based on analysis of historical data indicative of the Primary Currency value over a predetermined number of preceding years; wherein said processor is further configured to determine whether the Primary Currency value exceeds any high for the Primary Currency value during the predetermined number of preceding years; and
wherein said indication of the long term trend in the Primary Currency value versus multiple foreign currencies value is further based on analysis of historical data indicative of the Primary Currency value over a predetermined number of preceding years; wherein said processor is further configured to determine whether the Primary Currency value exceeds any low for the Primary Currency value during the predetermined number of preceding years.

11. The computerized apparatus of claim 10 wherein the predetermined number of preceding years comprises 5 years.

12. The computerized apparatus of claim 1 wherein said indication of the long term trend in the Primary Currency value versus multiple foreign currencies value is based on analysis of historical data indicative of the Primary Currency value over a predetermined number of preceding years; wherein said processor is further configured to determine whether the Primary Currency value exceeds any high for the Primary Currency value during the predetermined number of preceding years.

13. The computerized apparatus of claim 12 wherein the adjusted investment ratio for the multiple portfolio peers for a long term trend of increasing value for the Primary Currency and decreasing value for the Primary Interest Rate comprises: up to 35% into Domestic Equities; up to 35% into Domestic Fixed Income; up to 25% into Foreign Fixed Income; up to 25% into Foreign Equities; up to 20% into Commodities and Hard Assets; up to 15% into Precious Metals; and up to 10% into Domestic Equity Inverse.

14. The computerized apparatus of claim 12 wherein the adjusted investment ratio for the multiple portfolio peers for a long term trend of decreasing value for the Primary Currency and increasing value for the Primary Interest Rate comprises: up to 10% into Domestic Equities; up to 15% into Domestic Fixed Income; up to 15% into Foreign Fixed Income; up to 20% into Foreign Equities; up to 25% into Commodities and Hard Assets; up to 35% into Precious Metals; and up to 35% into Domestic Equity Inverse.

15. The computerized apparatus of claim 12 wherein said indication of the long term trend in the Primary Currency value versus multiple foreign currencies value is further based on analysis of historical data indicative of the Primary Currency value over a predetermined number of preceding years; wherein said processor is further configured to determine whether the Primary Currency value exceeds any low for the Primary Currency value during the predetermined number of preceding years.

16. The computerized apparatus of claim 15 wherein the predetermined number of preceding years comprises 5 years.

17. The computerized apparatus of claim 12 wherein the predetermined number of preceding years comprises 5 years.

18. The computerized apparatus of claim 1 wherein said indication of the long term trend in the Primary Currency value versus multiple foreign currencies value is based on analysis of historical data indicative of the Primary Currency value over a predetermined number of preceding years; wherein said processor is further configured to determine whether the Primary Currency value exceeds any low for the Primary Currency value during the predetermined number of preceding years.

19. The computerized apparatus of claim 18 wherein the predetermined number of preceding years comprises 5 years.

* * * * *